Figure 1:
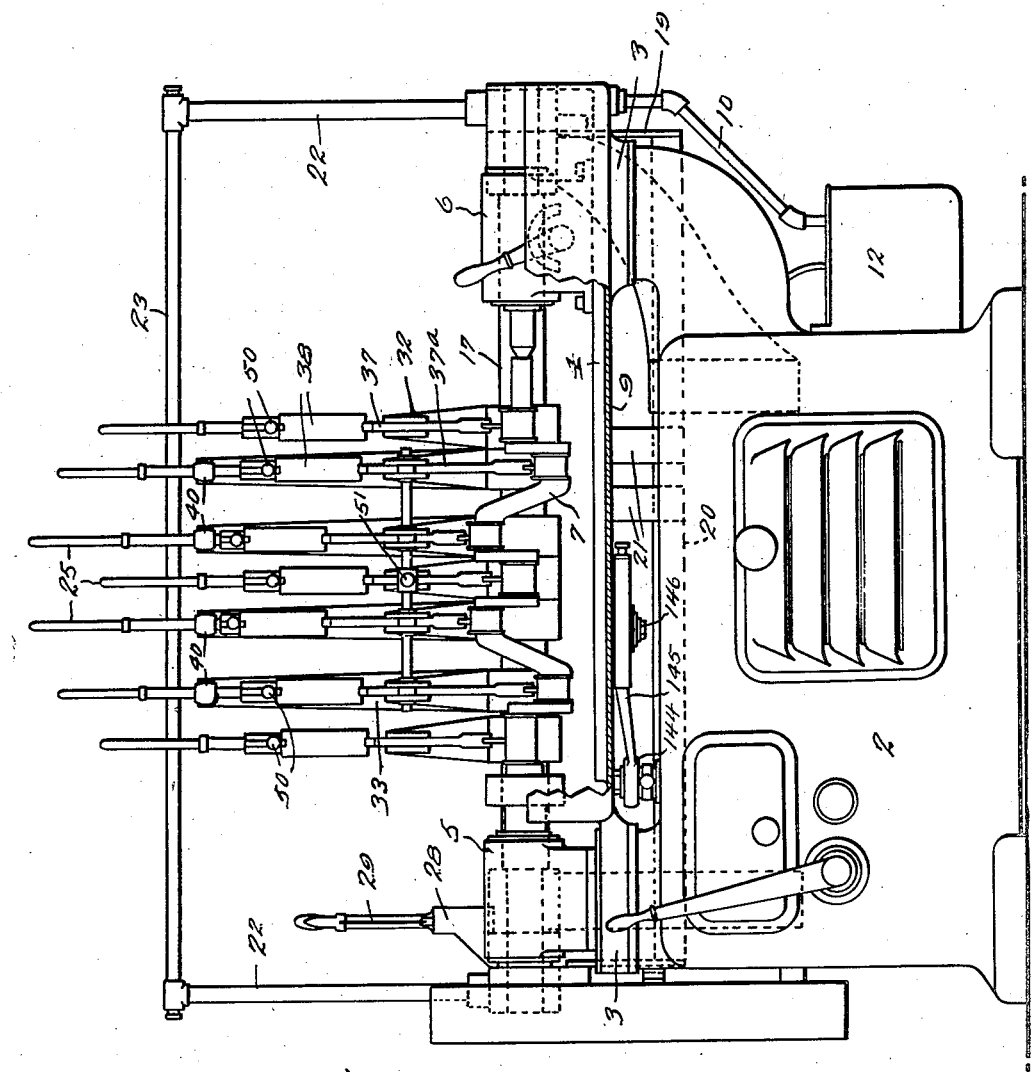

March 5, 1935. W. F. EGGER 1,993,543
MACHINE FOR HONING AND POLISHING CRANK SHAFTS
Filed April 29, 1932 11 Sheets-Sheet 1

March 5, 1935. W. F. EGGER 1,993,543
MACHINE FOR HONING AND POLISHING CRANK SHAFTS
Filed April 29, 1932 11 Sheets-Sheet 2

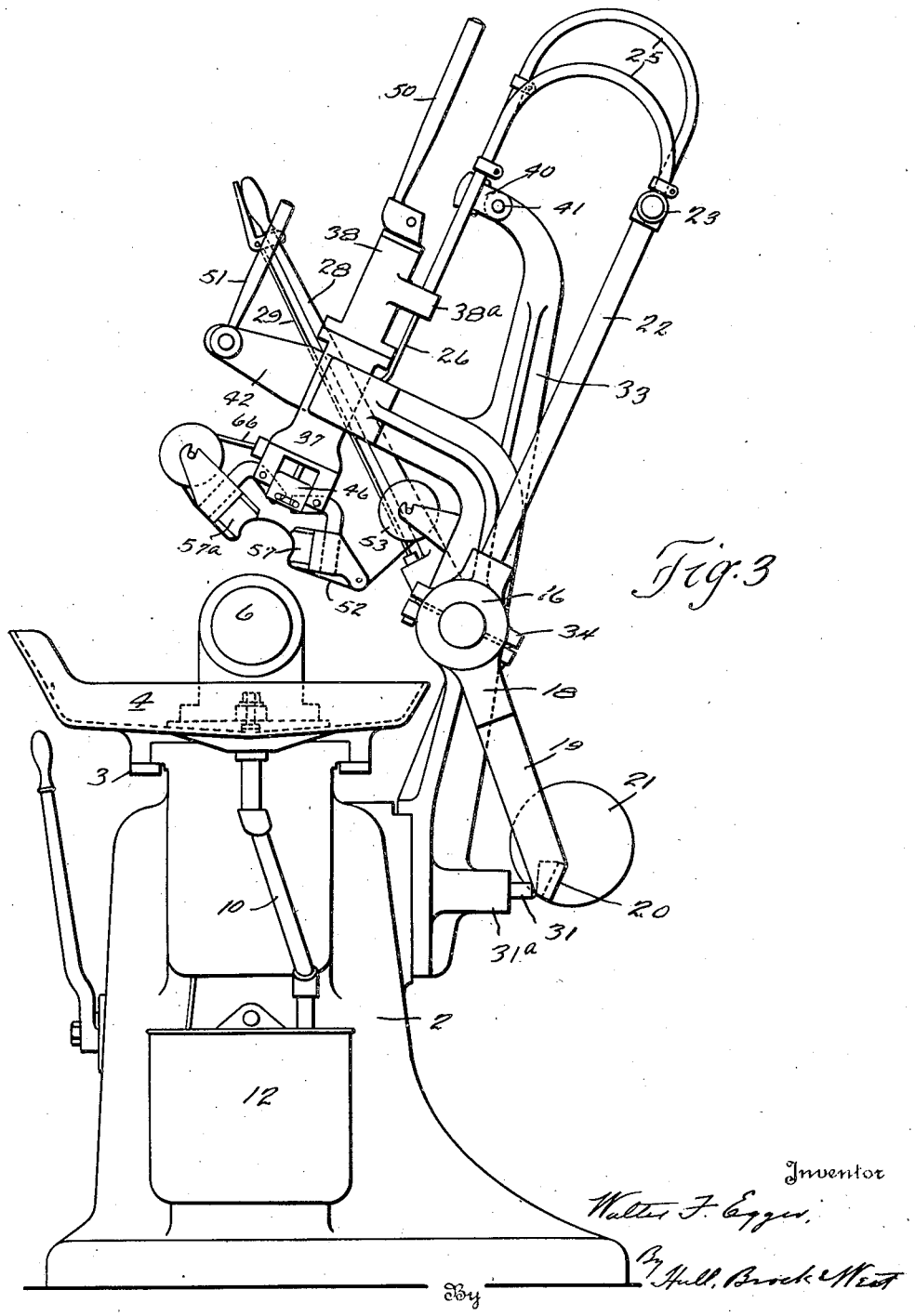

March 5, 1935. W. F. EGGER 1,993,543
MACHINE FOR HONING AND POLISHING CRANK SHAFTS
Filed April 29, 1932 11 Sheets-Sheet 4
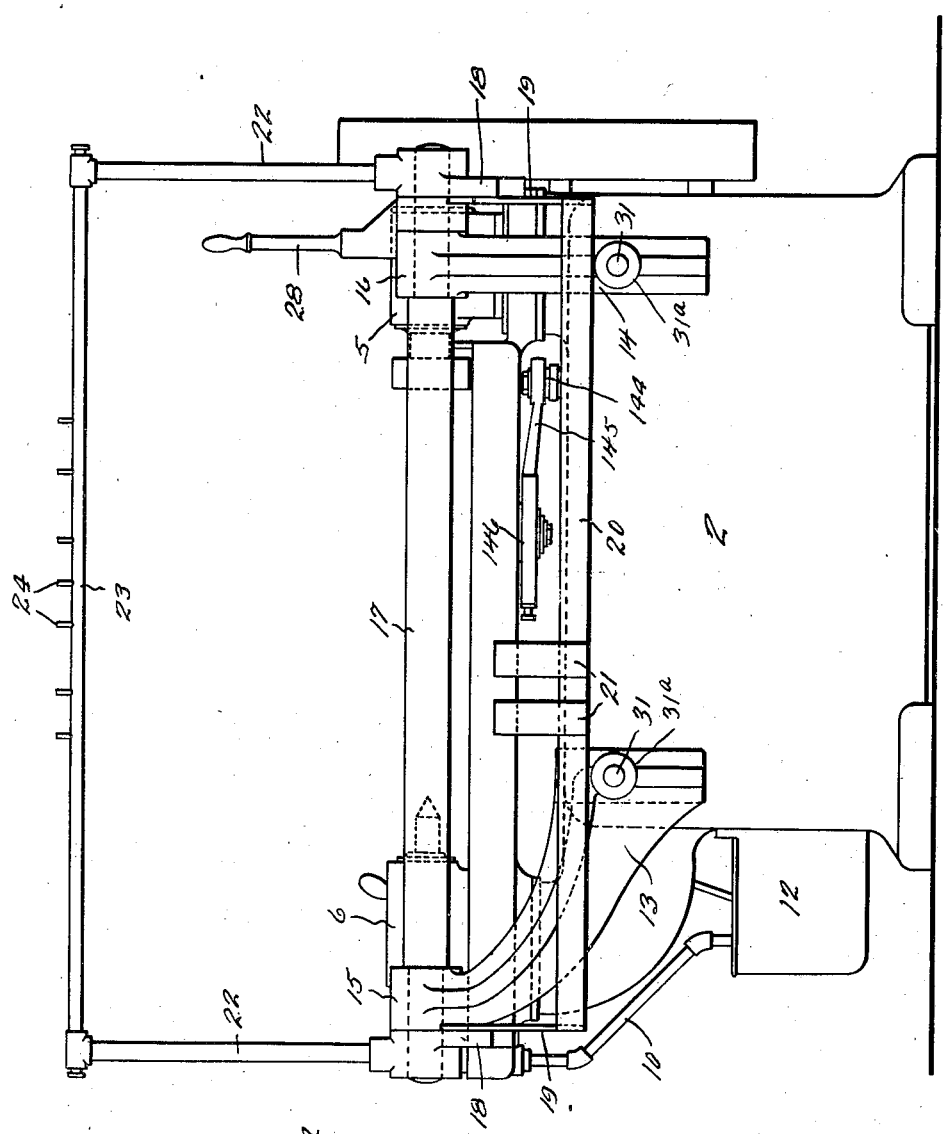

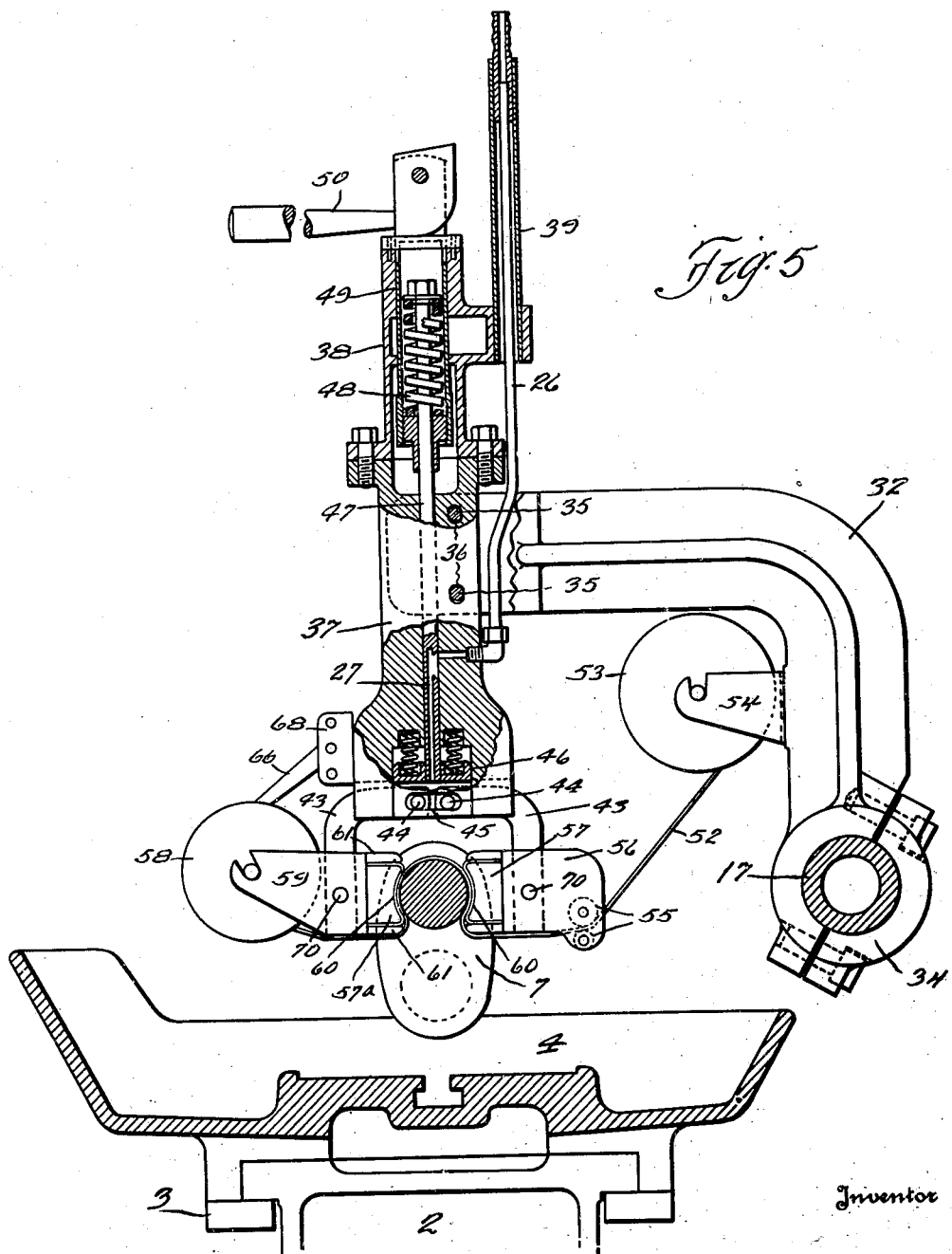

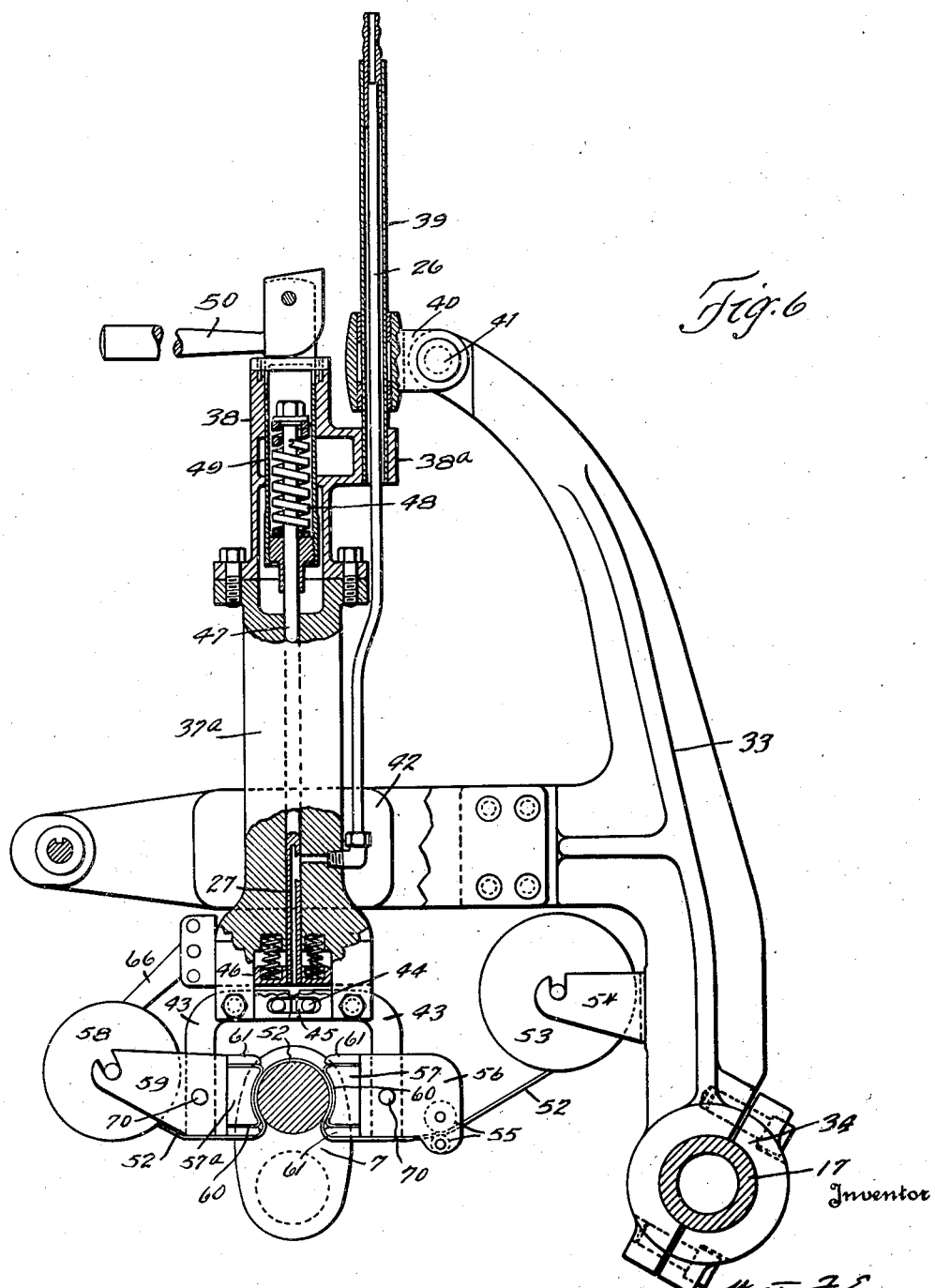

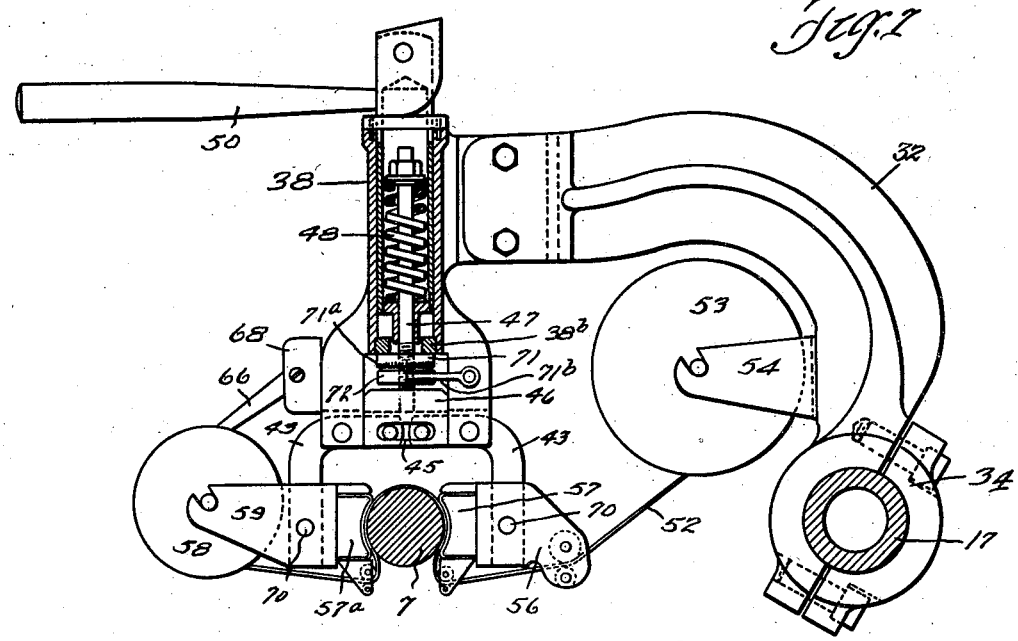
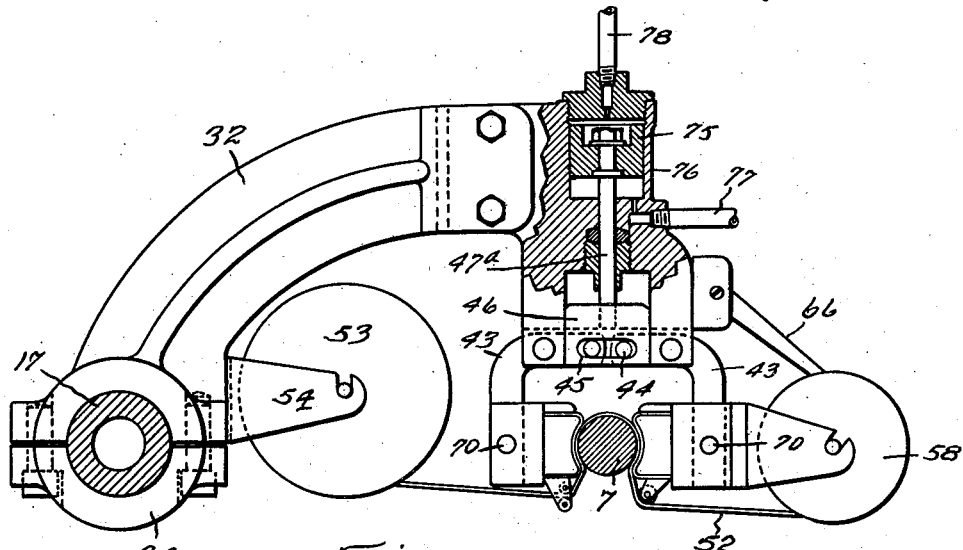

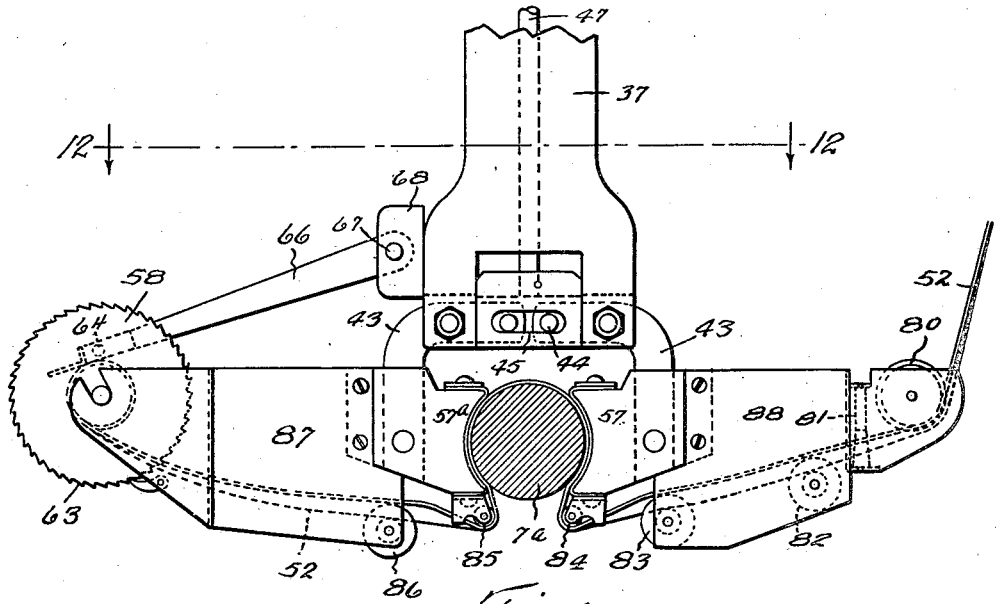
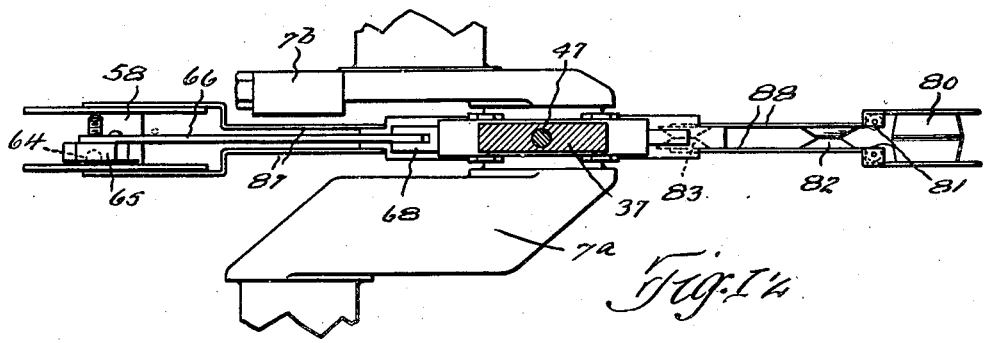
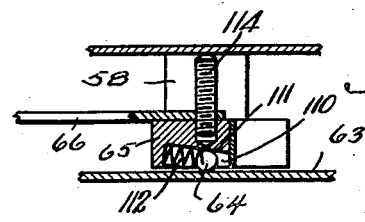

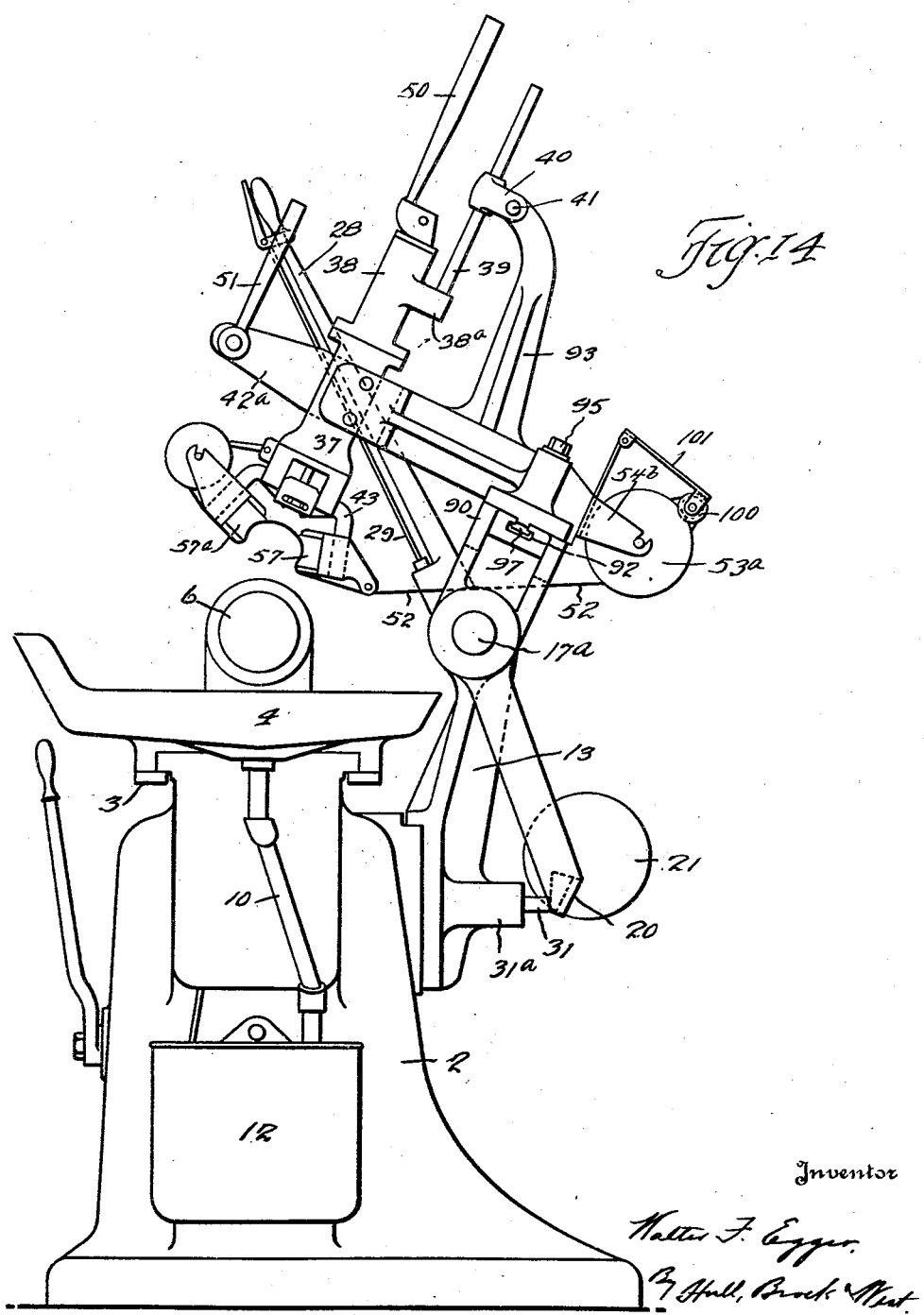

March 5, 1935. W. F. EGGER 1,993,543
MACHINE FOR HONING AND POLISHING CRANK SHAFTS
Filed April 29, 1932 11 Sheets-Sheet 11
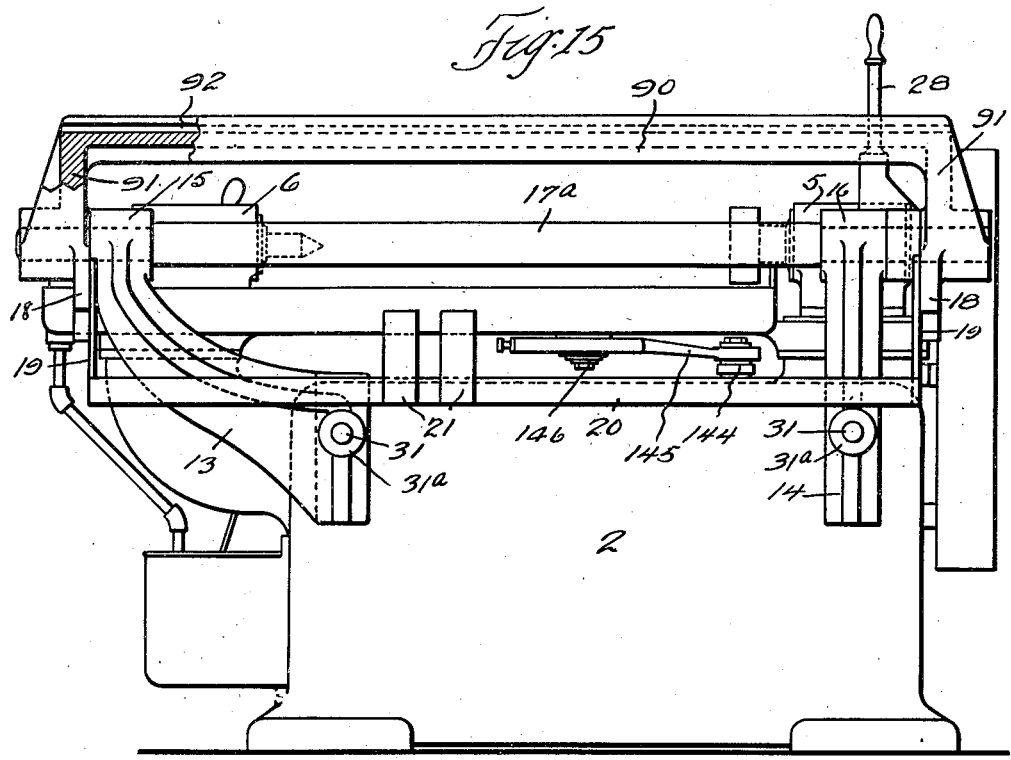
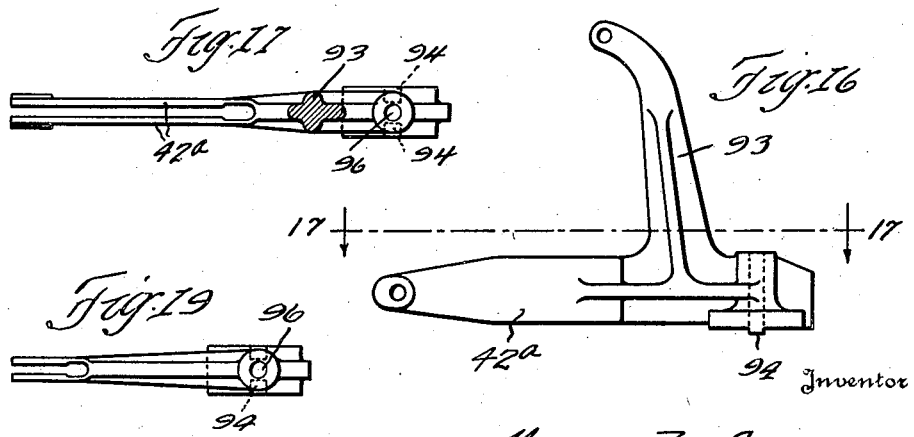

Patented Mar. 5, 1935

1,993,543

UNITED STATES PATENT OFFICE 1,993,543

MACHINE FOR HONING AND POLISHING CRANK SHAFTS

Walter F. Egger, Cleveland, Ohio, assignor, by mesne assignments, to Norton Company, Worcester, Mass., a corporation of Massachusetts Application April 29, 1932, Serial No. 608,321

18 Claims. (Cl. 51—73)

The present invention relates to metal working machines and more particularly to machines for lapping and/or finishing eccentric or concentric bearing surfaces, such as crank and main bearings, on a crank shaft.

An object of the invention is the provision of a machine of the character referred to provided with means for adjusting the various parts etc. whereby work of various shapes, forms and sizes may be finished therein, which will be simple and rugged in construction and which can be economically manufactured and employed.

Another object of the invention is the provision of a novel metal working machine wherein a plurality of tools etc. adapted to work and/or finish eccentric or concentric bearing surfaces are supported on a frame or frames movable about an axis spaced from the axis of the work to advance and retract the tools to and from the work.

Another object of the invention is the provision of a novel metal working machine for finishing annular or cylindrical bearing surfaces etc. wherein the tool or finishing material is in the form of a flexible sheet or strip fed from one reel to another and guided and applied to the bearing surfaces preferably embracing most of the circumference thereof.

Another object of the invention is the provision of a novel tool mechanism for applying a flexible finishing sheet or strip to an annular or cylindrical bearing surface etc. which is provided with floating blocks faced with a friction material, such as emery cloth, for holding the finishing material in engagement with the work.

Another object of the invention is the provision of a novel mechanism for supporting, applying and feeding a flexible finishing sheet or strip to an annular or cylindrical bearing surface etc. wherein the sheet or strip preferably embraces most of the circumference of the bearing surface and is intermittently fed so that a new surface is used on successive work pieces.

Another object of the invention is the provision of a novel machine of the character referred to provided with means which will automatically feed a finishing material in the form of a flexible sheet or strip, so that a new surface will be used on successive work pieces, upon actuation of the tools or means which applies the material to the bearing surface, to engage or disengage the work.

Another object of the invention is the provision of a machine of the character referred to provided with novel means for engaging and disengaging the tools or working material with the work pieces.

Another object of the invention is the provision of a novel method for finishing and/or working an annular or cylindrical bearing surface etc. partly enclosed by adjacent parts of the work piece, by rotation of the work and applying the finishing and/or working material to the work piece in the form of a flexible sheet or strip fed thereto in lengths by folding or creasing the same as it passes the enclosing parts of the work.

Another object of the invention is the provision of a novel metal working machine for finishing annular or cylindrical bearing surfaces etc. of a work piece which are partly enclosed, in which the work is rotated and the finishing material applied thereto in the form of a flexible sheet or strip fed relative to the work preferably intermittently, at predetermined intervals, and folded or creased where it passes the enclosing or overhanging parts of the work.

Figure 2:
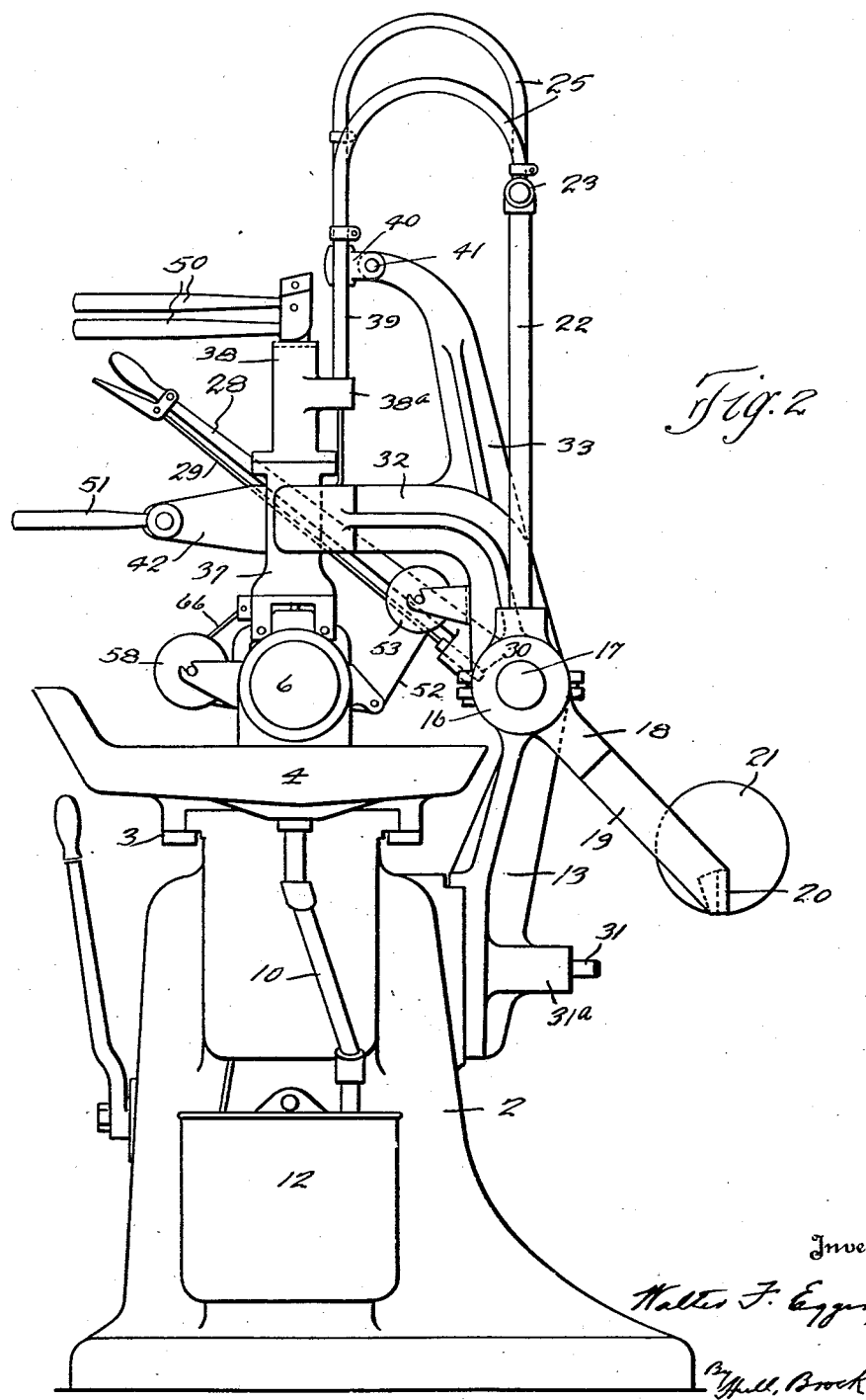
Figure 9:
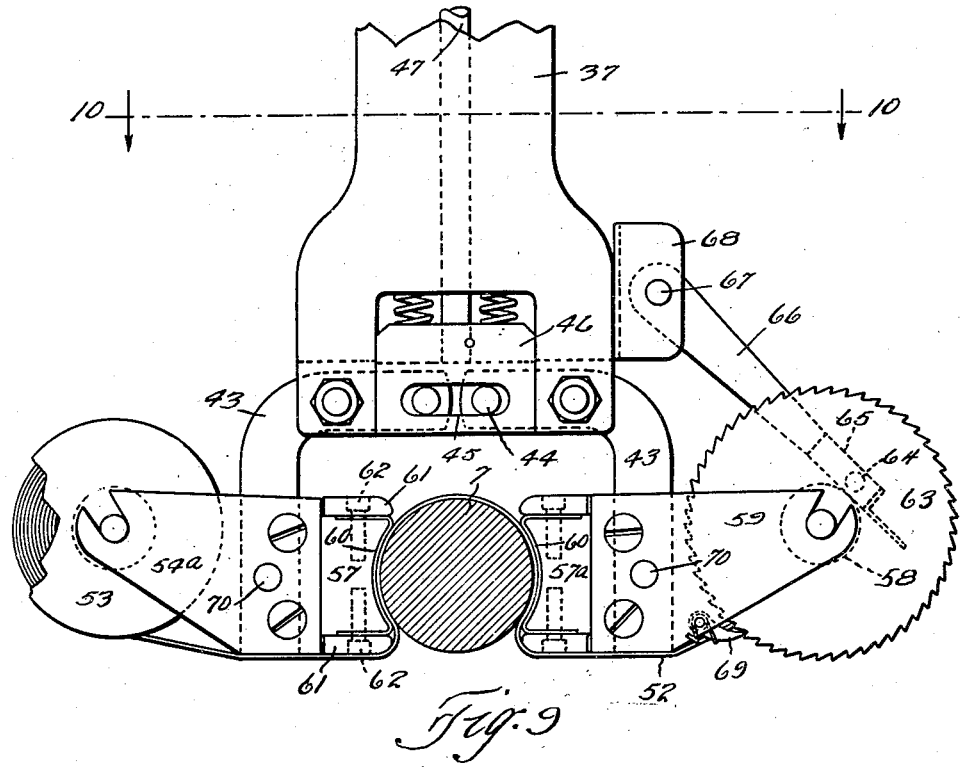
Figure 10:
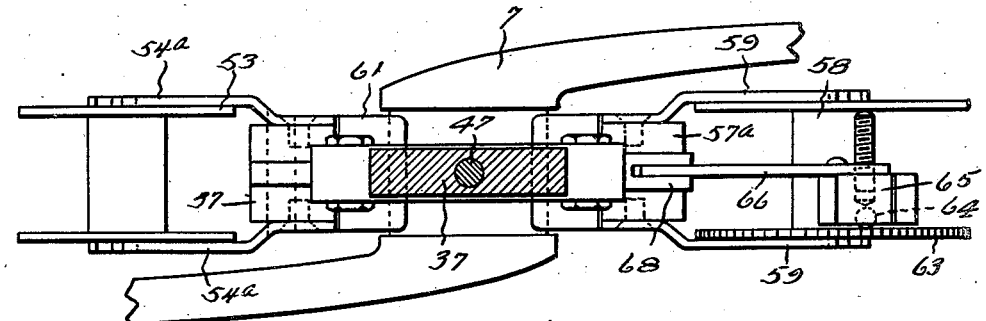

Further objects of the invention will be apparent to those skilled in the art from the following description of the preferred embodiment of the invention described with reference to the accompanying drawings in which Fig. 1 is a front elevation of a crank shaft finishing machine embodying the present invention; Fig. 2 is an end elevation of the machine as seen from the right in Fig. 1, with the parts in operating position; Fig. 3 is a similar view to Fig. 2, with the parts in inoperative position, or removed from the work; Fig. 4 is a partial rear elevation, the tool carriers and associated parts being omitted; Fig. 5 is a vertical section of one of the tools or finishing members such as used on the main or concentric bearings; Fig. 6 is a similar view of one of the tool or finishing members used on the crank pins; Fig. 7 is a view similar to Fig. 5 showing a modified construction; Fig. 8 is a view similar to Figs. 5 and 7 of a further modified construction; Fig. 9 is an enlarged detail in side elevation of one of the tool heads showing the means for feeding the finishing material, in the form of an emery or other flexible strip, and supporting the same around the bearing; Fig. 10 is a section on the line 10—10 of Fig. 9; Figs. 11 and 12 are views similar to Figs. 9 and 10 showing a modified construction for finishing counterbalanced crank shafts; Fig. 13 is a detail of the pawl or clutch for intermittently rotating the reel which feeds the flexible finishing strip; Fig. 14 is an end elevation, similar to Fig. 3, showing a modified construction; Fig. 15 is a partial rear elevation similar to Fig. 4, of the modification shown in Fig. 14; Fig. 16 is a detail in side elevation of one of the supporting arms shown in Fig. 14; Fig. 17 is a section on the line 17—17 of Fig. 16; Figs. 18 and 19 are respectively side and top views of a carrier arm used in the form shown in Fig. 14.

Referring to the drawings which illustrate the preferred embodiment of the present invention, Fig. 1 shows a machine somewhat similar to that disclosed in the patent issued April 25, 1933 to myself and Logan A. Becker No. 1,905,825. The invention is illustrated as applied to a machine for finishing the various main and crank bearings of a multi-throw crank shaft, but it is understood that the invention may be embodied in machines adapted to finishing eccentric or concentric annular or cylindrical bearing surfaces etc. on other types of work.

The work in the form of a crank shaft designated by the reference character 7 is supported between a head stock 5 and a tail stock 6. The head stock 5 and the tail stock 6 are supported by a bed 4 slidably supported on guides 3 formed in the upper side of a base 2, and the tail stock 6 is adjustable along the bed 4 towards and from the head stock to accommodate different sizes of work.

The head stock 5 is rotated in any convenient manner, preferably by mechanism such as a motor enclosed in the base 2 and connected to the head stock through a flexible drive chain. An oil pan 9 formed in the bed 4 discharges the oil collected therein through a pipe 10 into a tub 12 from which it is returned to the machine, as described in my said copending application. The bed 4 of the machine gives a reciprocatory movement during the finishing or working operation so that the finishing tools or material will reach the corners adjacent the cheeks of the crank and to prevent the development of radial lines on the bearing surfaces, by means comprising an eccentric 144, a rod 145, and a connection 146 similar to that disclosed in the above mentioned application.

As illustrated, two brackets 13 and 14 provided with bearings 15 and 16 at the top, are connected to base 2. A rock shaft 17 supported in these bearings forms a pivot or axis for a gang of tool carriers hereinafter described. Keyed to the ends of this rock shaft, outside the bearings, is a pair of arms 18 which, by extensions 19 bolted thereto, carry a rear bar 20 extending along and behind the rear of the machine. A number of counterweights 21 sufficient to counterbalance the tool carriers to be described, are positioned upon the bar 20. A pair of posts 22 supported on the members 18, carry a pipe 23 having nipples 24 to which flexible pipe or hose connections 25 are attached for the purpose of supplying kerosene or other wash fluid through pipes 26 and passages 27 to the work.

Fixed to the rock shaft 17, beside the bearing 16, is a hand lever 28 for the purpose of rocking the same, to swing the tools to and from the work. The lever 28 is provided with a latch device 29, of well known construction, which engages in a notch indicated at 30, formed in the bearing 16, to hold the tools in operative position when swung down to the work, as indicated in Fig. 2. When the latch is released and the lever is swung back, the tools rock or swing out to an inoperative position, as shown in Fig. 3, limited by the engagement of the bar 20 against spring pressed plungers 31 mounted in suitable hollow bosses 31a on the brackets 13 and 14.

It will now be seen that by the means described, the whole gang of tools can be applied to or removed from the work simultaneously by simple movements of the hand lever 28 and the rock shaft 17, permitting the work to be quickly changed by swinging the parts to the position shown in Fig. 3, which allows the removal of a finished crank shaft and the insertion of another one between the centers. Then all the tools are applied simultaneously to the new work by pulling the lever 28 forwardly to the position shown in Fig. 2, in which position it is locked by the engagement of the latch device 29 in the notch 30.

The means for supporting the tools or finishing material may take various forms, some of which are illustrated. Fig. 5 shows a supporting means for the tools which act on the main or concentric bearing. Fig. 6 shows one which acts on a crank pin or eccentric bearing. Each comprises an arm 32 as in Fig. 5 or an arm 33 as in Fig. 6 clamped on the shaft 17 as indicated at 34. By loosening the clamps the arms can be shifted along the rock shaft as required, depending on the particular crank shaft being finished. The tool carrier for the main or concentric bearings, as shown in Fig. 5, has little or no movement and therefore is fixed to the end of the arm 32 by bolts 35 having a slight clearance in the holes 36 in the carrier plate 37 sufficient to accommodate slight irregularities in the main bearings. The tool carrier for the crank pins or eccentric bearings, shown in Fig. 6, follows the throw of the cranks, and therefore the carrier plate 37a is fixed to a casing 38 which has a projection 38a with a sleeve 39 slidable in a knuckle 40 pivoted at 41 to the end of the arm 33, and the carrier plate 37a slidably engages cheek plates or guides 42 projecting from the arm 33. In each instance the carrier plate 37 or 37a has at its lower end a pair of pivoted jaws 43 connected by pins 44 working in a slot 45 in a block 46. The block 46 is connected to a rod 47 urged upwardly by a spring 48 carried in a tube 49 raised or lowered by a cam lever 50 working on top of the housing 38. This structure and the operation thereof to open or close the jaws is substantially the same as that disclosed in the aforesaid application, and it is believed further description is not required here. The carrier plates 37a may be clamped between the guides 42 by the clamping lever 51 to retain them in their same relative positions, when the tools are swung away from the work, also as described in said application.

As illustrated, the tool or working material comprises a flexible sheet or strip having an abrading or polishing surface, such as a strip of abrasive paper or cloth or other finishing material, indicated at 52. As shown especially in Figs. 5 and 6 this strip is fed from a supply spool 53, mounted in brackets 54 on the supporting arm, and passes between guide rollers 55, rotatably supported by plates 56 carried by one of the jaws 43, and thence over a block 57 and upwardly around the bearing or work and thence downwardly between the work and an opposite block 57a to a take-up reel or spool 58 supported between brackets 59. When the jaws 43 are in operative position, as shown in Figs. 2, 5 and 6, the bearings or surfaces to be worked or finished will run in contact with the abrading or polishing surface of the strip 52 between the blocks 57, whereby the working or finishing action will be performed. Preferably the blocks 57, 57a are faced with a friction material, such as an abrasive cloth 60, clamped on the face of the blocks by plates 61 and bolts 62 (see Fig. 9), to assist in holding the strip in position relative to the blocks, and prevent tearing of the same during the working or finishing operation.

For intermittently feeding a new length of strip 52, I use a ratchet wheel 63, see Figs. 9, 10 and 13, forming one end of the take-up reel 58, and a one-way driving or ball clutch device indicated at 64 engageable with the ratchet wheel 63. The clutch 64 is carried in a clutch box 65 fixed to an arm 66 pivoted at 67 to a bracket 68 on the head of the tool carrier. As illustrated in Fig. 13, the clutch box 65 is provided with a recessed portion 110 having an inclined surface 111. A spring 112, maintained under tension against the clutch ball 64, tends to move the ball down the inclined surface and wedge it between the inclined surface and the inner face of the ratchet wheel 63. An adjustable screw 114 regulates the position of the clutch box 65 so that the ball 64 may automatically engage or disengage the ratchet wheel as desired. A spring-pressed pawl 69 (Fig. 9) is suitably supported in engagement with the ratchet wheel to positively engage the teeth thereon and permit counterclockwise rotation of the take-up reel 58, but prevent clockwise rotation of the take-up reel. As the jaws 43 are opened, as shown in Fig. 3, by operation of the lever 50, the take-up reel swings outwardly and the ball clutch slides on the inner face of the ratchet wheel without imparting any rotation thereto. The movement of the ball clutch on the ratchet wheel causes the ball 64 to compress spring 112 and roll up inclined surface 111, thereby disengaging from the inner face of ratchet wheel 63.

If the ball clutch exerted sufficient friction to tend to rotate the take-up reel in a clockwise direction during the opening of jaws 43, such rotation would be prevented by the engagement of pawl 69 with the ratchet wheel teeth. Hence, it will be apparent that the arm 66 will swing upon its pivot and the ball clutch will slide through a given distance on the inner face of the ratchet wheel. When the ball clutch has completed its sliding movement, the spring 112 forces ball 64 down the inclined surface 111 and wedges it against the ratchet wheel 63, as shown in Fig. 13. After a new piece of work is inserted, the jaws 43 are closed to an operative position, causing the take-up reel 58 to move to the position shown in Fig. 9. At this time, the ball clutch 64 wedges tightly between the inclined surface 111 and the ratchet wheel and partially rotates the take-up reel in a counterclockwise direction to wind a given amount of the strip 52 thereon and draw a new length of abrasive strip from the supply reel 53 to a position for operation on the work.

The location of the supply reel 53 is not material to the operation of the device, and in Figs. 2, 3, 5 and 6 it is shown mounted in brackets 54 on the supporting arm 32 or 33. In Fig. 9 it is shown mounted in brackets 54ª fixed to the block 57. In this connection it may be mentioned that both of the blocks 57 and 57ª are pivotally connected as at 70 to the jaws, sufficient to allow a slight rocking motion to permit the concave sides of the block to accommodate themselves to the bearing.

In the modified form shown in Fig. 7 the parts are similar in construction to those above described, but modified to include a calipering device, to limit and gauge the size to which the work may be finished. For this purpose the rod 47, which is connected to the jaws 43 as above described to open and close the same, has two collars 71 and 72, threaded thereon, the collar 71 having graduations on its periphery as indicated at 71ª which cooperate with a pointer 71ᵇ. The collar 72 acts as a locking collar to lock the collar 71 in any set position. As the working or finishing proceeds, the jaws will be drawn together by the spring 48 until the collar 71 abuts a stop 38ᵇ in the lower end of the housing 38, after which no further metal will be removed from the work. The take-off of the tool is therefore limited to the travel of the collar 71, and this travel may be adjusted by screwing the collar 71 up or down on the rod 47.

In the modification shown in Fig. 8, instead of mechanical means to operate the jaws 43, they are opened or closed by fluid pressure. The rod 47ª which is connected to the jaws carries a piston 75 working in the cylinder 76. Fluid pressure is admitted under the piston by a pipe 77 to move the same to close the jaws 43. To open them pressure is admitted through a pipe 78 to the upper side of the piston, forcing it down and opening the jaws to release the work and permit the tool to be swung away. Suitable valve means (not shown) connected to pipes 77 and 78, is provided for controlling the flow of fluid to the cylinder 76 and may be manually operated or automatically operated in timed relation to other operations of the machine.

The modification shown in Figs. 11 and 12 is adapted for use on counterbalanced crank shafts, such as indicated at 7ª, the counterbalance being shown at 7ᵇ. With such work the counterbalance extends partly into the line of throw of the crank pin, and in the construction previously described, would strike and tear the flexible working strip 52. To prevent the tearing of strip 52, means are provided to partly fold the same so that the counterweight may pass it as the crank shaft is revolved. The strip 52 comes off the supply roll 53, not shown in Fig. 11, but see Figs. 5 and 6, and passes around a breaking or folding roller 80 which breaks or folds it lengthwise, and thence between a pair of side rolls 81 which bend up the side edges, whereby it is narrowed. From the rolls 81, the strip 52 passes over V-shaped rolls 82 and 83 which maintain the fold, to a roller 84 where it is again flattened, and thence in its flattened condition passes around the work. From the work the strip 52 passes over a roll 85, a V-shaped roll 86 carried by inwardly offset side plates 87 where it is again folded between said plates, and to the take-up reel 58 when it is again flattened. The rollers 80, 81, 82 and 83 are carried between inwardly offset side plates 88, with the rollers 82 and 83 being supported by the inwardly offset portion thereof. The plates 87 and 88 are supported by the jaws 43. It will be understood that the plates 87 and 88 are offset inwardly toward each other a sufficient distance to permit the counterweight 7ᵇ to pass them as the crank shaft is rotated. The means for feeding the strip 52 from the supply reel to the take-up reel are the same as above described. The construction illustrated in these figures, as stated above, permits the use of a strip 52 wider than the effective clearance space between the cheeks of a counterweighted crank shaft whereby the entire surface of the bearing can be finished, including the part thereof overhung by the counterweight.

In the modification shown in Figs. 14 to 19, means differing from those above described are provided for the purpose of supporting the tool carriers. Instead of being supported directly on the rock shaft 17, the carriers are attached to a saddle 90 fixed on a rock shaft 17ᵃ corresponding to the rock shaft 17. The saddle 90 has the form of an elongated plate with drop extensions 91 at the ends, corresponding to the arms 18 of Fig. 4 and connected to the cross bar 20 which supports the counterweights. The upper face of the saddle 90 has a T-slot 92. The supporting arms 93, shown in Fig. 16, have lugs 94 which fit in the slot, and can be adjusted along the saddle to any desired position. Bolts 95 extending through holes 96 in the arms, with heads 97 engaged in the T-slot 92, clamp the arms in position. It will be understood that the arms 93 shown in Figs. 16 and 17 are for supporting the tool or finishing material acting on the crank pins or eccentric bearings. The arms shown in Figs. 18 and 19 are for supporting the tools or finishing material acting on the main or concentric bearings. With the construction shown in Fig. 14 the knuckles 40 are pivoted to the upper extension, and the carriers 37ᵃ work between the guides 42ᵃ at the lower part of the arms. In this modification, the supply reel 53ᵃ is mounted on a bracket 54ᵇ projecting rearwardly from the saddle 90, and the strip 52 passes over a drag roller 100 carried by a pivoted arm 101 supported on the saddle 90 and then under the saddle to the work. The drag roller 100 rests on the reel and prevents spinning thereof.

It is believed that the operation of the machine will be evident from the above description but it may be summarized as follows. The work is positioned between the head and tail stock centers with the tool carriers swung up and back as shown in Fig. 3. After the work is positioned the lever 28 is pulled forwardly and latched, rocking the shaft 17 and moving the jaws 43 to a position at opposite sides of the work to be finished, and the clamping lever 51 is moved to inoperative position. The jaws 43 are then closed by movement of the lever 50, and the strip 52 takes a position around the work to be finished, after which the machine is started. Then as the shaft rotates and at the same time is reciprocated longitudinally by movement of the bed 4, the tools or finishing material simultaneously work or finish both the eccentric and concentric surfaces to the extent desired. After the finishing operation is completed, the machine is stopped and the lever 51 operated to clamp all the swinging tool carriers in fixed position relative to each other, and the levers 50 moved to open the jaws 43. The latch 29 is operated to permit the lever 28 to be moved upwardly and rearwardly, swinging all the tool carriers away from the work at a single operation, after which the finished work is removed and another work piece set in place. As a part of each cycle of operation, as described above, the opening and closing of the jaws operates the take-up reel and pulls a new length of strip 52 from the supply reel to present a new abrading or polishing surface to the new work piece.

The invention has been described with reference to the preferred embodiments thereof but I do not wish to be limited to the particular construction shown as the invention is capable of being embodied in various constructions. This invention is intended to cover any and all variations, adaptations or uses thereof as come within the knowledge or customary practice in the art to which it pertains.

Having thus described my invention, what I claim is:

1. In a machine of the character described, the combination of a work support adapted to rotatably support a work piece, a plurality of tool supports adapted to support tools adjacent said work support, means connecting said work support and tool supports adapted to permit relative swinging movement between said supports to advance and retract the tools and work relative to each other, manually operable means for moving said work support and tool supports relative to each other, and manually operable means for locking said supports in predetermined relative positions.

2. A lapping machine comprising a work support adapted to rotatably support a work piece, a plurality of lapping tool supports including jaws arranged to present tools on opposite sides of the work, a pivotal support for moving the jaws to and from association with the work, a vertically movable member slidably mounted on the pivotal support, means on said member which movably and adjustably carries said jaws, and means for moving the jaws towards and from the work.

3. In a machine of the character described, the combination of a work support adapted to rotatably support a work piece, a plurality of tool supports adapted to support tools adjacent said work support, means for adjusting said tool supports relative to each other, a pivotal connection between said work support and said tool supports adapted to permit swinging movement between the same, manually operable means for moving one of said supports about said pivotal connection to advance and retract the tools and work relative to each other, and means for locking said supports in predetermined relative positions.

4. In a machine of the character described, the combination of a work support adapted to rotatably support a work piece, a lapping tool and a holder therefor, a shaft rotatably supported adjacent said work support, a tool holder support carried by said shaft, connections between the tool holder support and the tool holder arranged to permit the tool to move relative to the support and remain in operative engagement with the work, and means for rocking said shaft to advance and retract the tool toward and from the work.

5. In a machine of the character described, the combination of a work support adapted to rotatably support a work piece, a lapping tool and a holder therefor, a shaft rotatably supported adjacent said work support, a tool holder support pivotally carried by said shaft, connections between said tool holder support and the tool holder arranged to permit the tool to move relative to the support and remain in operative engagement with the work, means for adjusting said tool support longitudinally of said shaft, and means for rocking said shaft to advance and retract the tool toward and from the work.

6. In a machine of the character described, the combination of a base, a work support carried by said base adapted to rotatably support a work piece, a plurality of tool supports pivotally supported by said base, means for adjusting and positively locating the tool supports longitudinally of said base, and means for moving said tool supports about their pivotal connection whereby the same are moved toward and from the work support.

7. In a machine of the character described, the combination of a work support adapted to rotatably support a work piece, means for adjusting said work support to accommodate different sizes of work pieces, a rock shaft, a plurality of pivotally mounted tool supporting arms fixed to rock with said shaft and adapted to support tools adjacent said work support, a tool support slidably mounted on each arm, and means for rocking the shaft whereby all of the tools may be simultaneously advanced and retracted towards and from the work.

8. In a machine of the character described, the combination of a work support adapted to rotatably support a work piece, a lapping tool engageable therewith, a rock shaft, a supporting arm secured to said shaft and arranged for movement therewith, a tool carrier slidably and pivotally supported by said arm, and means to rock said shaft and move the lapping tool into and out of operative engagement with the work.

9. In a machine of the character described, the combination of a work support adapted to rotatably support a work piece, means for adjusting the work support to accommodate different work sizes, a plurality of lapping tools engageable with various stations on the work, a rock shaft, a plurality of supporting arms secured thereto, means to adjustably and individually locate each of the arms on the rock shaft, a tool carrier vertically slidable on and pivotally supported by each of said arms, and means to move the rock shaft and simultaneously move all of the lapping tools into and out of operative position.

10. In a machine of the character described, the combination of a work support adapted to rotatably support a work piece, a tool carrier movable toward and from said work support, a flexible strip of working material supported adjacent said tool carrier, clamping means carried by said tool carrier adapted to simultaneously apply said strip to opposite sides of the work, means for feeding said strip relative to said clamping means, means for folding said strip into a V-shape as it is fed to said clamping means, and means for unfolding said strip at said clamping means.

11. In a machine of the character described, the combination of a work support adapted to rotatably support a work piece, a tool carrier movable toward and from said work support, a flexible strip of working material supported adjacent said tool carrier, clamping means carried by said tool carrier adapted to apply said strip to the work, means for feeding said strip relative to said clamping means, means for folding said strip as it is fed to said clamping means, means for unfolding said strip at said clamping means, and means for folding said strip as it passes from said clamping means.

12. In a machine of the character described, the combination of a tool carrier, a flexible strip supported adjacent said tool carrier, clamping means supported by said tool carrier for applying said strip to a revolving work piece having an overhanging portion, a supply reel supported adjacent said tool carrier for supplying said strip, a take-up reel supported adjacent said tool carrier for taking up said strip, means for feeding said strip from said supply reel to said take-up reel, and means for folding said strip as it advances to said clamping means past the revolving work piece.

13. In a machine of the character described, the combination of a tool carrier, a flexible strip supported adjacent said tool carrier, clamping means supported by said tool carrier for applying said strip to a work piece, a supply reel supported adjacent said tool carrier for supplying said strip, a take-up reel supported adjacent said tool carrier for taking up said strip, means for feeding said strip from said supply reel to said take-up reel, means for folding said strip as it advances to said clamping means, and means for unfolding said strip at said clamping means.

14. In a machine of the character described, the combination of a tool carrier, a flexible strip supported adjacent said tool carrier, clamping means supported by said tool carrier for applying said strip to a work piece, a supply reel supported adjacent said tool carrier for supplying said strip, a take-up reel supported adjacent said tool carrier for taking up said strip, means for feeding said strip from said supply reel to said take-up reel, means for folding said strip as it advances to said clamping means, means for unfolding said strip at said clamping means, and means for folding said strip as it passes from said clamping means to said take-up reel.

15. In a machine of the character described, the combination of a work support adapted to rotatably support a work piece, a lapping tool engageable therewith, a tool carrier movable toward and from said work support, clamping means pivotally connected to said tool carrier adapted to engage and disengage the tool with the work, and fluid pressure means for actuating said clamping means.

16. In a machine of the character described, the combination of a tool carrier, a flexible strip supported adjacent said tool carrier, clamping means carried by said tool carrier for applying said strip to a work piece, said clamping means including a floating block faced with a friction material, fluid pressure means on the tool carrier for actuating said clamping means to engage and disengage the work, a supply reel supported adjacent said tool carrier for supplying said strip, a take-up reel supported adjacent said tool carrier for taking up said strip, and means for intermittently feeding the strip actuated by the movement of said clamping means to engage the work.

17. The method of finishing a bearing surface on a member which is overhung by adjacent parts of said member, which comprises rotating said member about an axis parallel with the axis of said bearing surface, supporting a working material in the form of a strip adjacent said member, applying said strip to said bearing surface between its supports, and folding said strip between the work and said supports to provide clearance for said overhanging portions.

18. The method of finishing a bearing surface on a member which is overhung by adjacent parts of said member, which comprises rotating said member about an axis parallel with the axis of said bearing surface, supporting a working material in the form of a strip adjacent said member, applying said strip to said bearing surface between its supports, feeding said strip relative to said work, and folding said strip as it approaches said work and again as it leaves said work to provide clearance for said overhanging portions.

WALTER F. EGGER.